(12) United States Patent
Delia et al.

(10) Patent No.: US 8,146,385 B2
(45) Date of Patent: Apr. 3, 2012

(54) METHODS FOR SEPARATING GLASS SHEETS FROM CONTINUOUS GLASS RIBBONS

(75) Inventors: Julie A. Delia, Horseheads, NY (US); Marvin W. Kemmerer, Odessa, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 51 days.

(21) Appl. No.: 12/770,164

(22) Filed: Apr. 29, 2010

(65) Prior Publication Data

US 2011/0265519 A1   Nov. 3, 2011

(51) Int. Cl.
*C03B 21/02* (2006.01)
(52) U.S. Cl. .................... 65/97; 225/4; 65/174
(58) Field of Classification Search .............. 65/97, 112, 65/174; 225/4, 6, 2, 96, 96.5; 83/879, 880
See application file for complete search history.

(56) References Cited

U.S. PATENT DOCUMENTS

2008/0276646 A1* 11/2008 Chalk et al. ..................... 65/17.2
2011/0126593 A1*  6/2011 Abdul-Rahman et al. ........ 65/97

FOREIGN PATENT DOCUMENTS

JP   2008-19102    1/2008
JP    200819102  * 1/2008

OTHER PUBLICATIONS

JP 2008-19102 (Translation), [completed on Apr. 29, 2010], Translated by Phoenix Translations.*

* cited by examiner

*Primary Examiner* — Matthew Daniels
*Assistant Examiner* — Yana Belyaev
(74) *Attorney, Agent, or Firm* — Kevin M. Able (57) ABSTRACT

Methods for separating glass sheets from glass ribbons are disclosed. One method includes forming a glass ribbon having a curvature in a lateral direction. A conformable nosing is engaged with a first surface of the glass ribbon such that the conformable nosing conforms to the curvature of the glass ribbon. The glass ribbon is scored along a scoring line on a second surface of the glass ribbon. The conformable nosing is then at least partially disengaged from the first surface of the glass ribbon by adjusting a bow of the conformable nosing. A bending moment is applied to the glass ribbon to separate a glass sheet from the glass ribbon at the scoring line. Application of the bending moment conforms the curvature of the glass ribbon to the bow of the conformable nosing prior to the glass sheet separating from the glass ribbon.

20 Claims, 7 Drawing Sheets

METHODS FOR SEPARATING GLASS SHEETS FROM CONTINUOUS GLASS RIBBONS

BACKGROUND

1. Field

The present specification generally relates to methods for forming glass sheets from continuous glass ribbons and, more particularly, to methods of scoring and separating glass sheets from continuous glass ribbons.

2. Technical Background

Continuous glass ribbons may be formed by processes such as the fusion draw process or other, similar downdraw processes. The fusion draw process yields continuous glass ribbons which have surfaces with superior flatness and smoothness when compared to glass ribbons produced by other methods. Individual glass sheets sectioned from continuous glass ribbons formed by the fusion draw process can be used in a variety of devices including flat panel displays, touch sensors, photovoltaic devices and other electronic applications.

Continuous glass ribbons formed by the fusion draw process often bow or curve in a lateral direction due to temperature gradients in the glass as it cools. After the glass ribbon is drawn, individual sheets of glass are sectioned from the ribbon by supporting the glass ribbon with a nosing device as the glass ribbon is scored and separated along the scoring line. When a flat nosing device is used to support the continuous ribbon during scoring, engaging the scoring device with the curved glass ribbon tends to flatten the glass ribbon thereby introducing stress into the glass ribbon which may distort or break the glass ribbon during scoring. The contact between the scoring device and the curved glass ribbon also introduces motion in the ribbon which is propagated upstream of the scoring device and causes undesirable stress and warp in the ribbon. When a bowed nosing device (i.e., a nosing device which is curved to match the curvature of the glass ribbon) is utilized, stresses and ribbon motion introduced during the scoring operation are reduced as the curved nosing device conforms to the contours of the glass ribbon thereby supporting the glass ribbon and preventing the glass ribbon from being flattened against the nosing. However, when a bending moment is applied to the glass ribbon to bend the glass ribbon against the curved nosing and separate a glass sheet from the glass ribbon at the score line, the curved glass ribbon is constrained against the curved nosing and, as a result, stress is introduced in the glass in the nosing contact area which causes unwanted breakage of the glass sheet and/or the glass ribbon adjacent to the score line. While this type of uncontrolled breakage occurs in glass ribbons of all widths, the problem is particularly prevalent for glass ribbons of larger widths (i.e., widths of 1.5 meters or greater).

Accordingly, a need exists for alternative methods of separating glass sheets from continuous glass ribbons to prevent unwanted breakage.

SUMMARY

According to one embodiment, a method for forming a glass sheet from a continuous glass ribbon includes forming a continuous glass ribbon having a curvature in a lateral direction. A bow of a conformable nosing is adjusted to a scoring bow which conforms to the curvature of the continuous glass ribbon. The conformable nosing is then engaged with a first surface of the continuous glass ribbon such that the conformable nosing contacts the first surface of the continuous glass ribbon on a nosing contact line. The continuous glass ribbon is then scored along a scoring line on a second surface of the continuous glass ribbon. The scoring line is opposite the nosing contact line. The bow of the conformable nosing is then readjusted to a separation bow such that the conformable nosing is at least partially disengaged from the first surface of the continuous glass ribbon along a length of the nosing contact line. A bending moment is applied to the continuous glass ribbon to separate a glass sheet from the continuous glass ribbon at the scoring line. Application of the bending moment reengages the continuous glass ribbon with the conformable nosing along the length of the nosing contact line and conforms the curvature of the continuous glass ribbon to the separation bow of the conformable nosing prior to the glass sheet separating from the continuous glass ribbon.

In another embodiment, a method for separating a glass sheet from a continuous glass ribbon includes forming a continuous glass ribbon having a curvature in a lateral direction. The curvature of the continuous glass ribbon is determined and a conformable nosing is engaged with a first surface of the continuous glass ribbon such that the conformable nosing contacts the first surface of the continuous glass ribbon and conforms to the curvature of the continuous glass ribbon along a nosing contact line. A passive support device may be engaged with a second surface of the continuous glass ribbon. The continuous glass ribbon is then scored along a scoring line on a second surface of the continuous glass ribbon. The scoring line is positioned opposite the nosing contact line. The conformable nosing is disengaged from the first surface of the continuous glass ribbon along at least a portion of a length of the nosing contact line. A bending moment is then applied to the continuous glass ribbon to separate a glass sheet from the continuous glass ribbon at the scoring line. Application of the bending moment reengages the continuous glass ribbon with the conformable nosing along the length of the nosing contact line and conforms the curvature of the continuous glass ribbon to a bow of the conformable nosing prior to the glass sheet separating from the continuous glass ribbon.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of methods for separating glass sheets from continuous glass ribbons, examples of which are illustrated in the accompanying drawings. Whenever possible, the same reference numerals will be used throughout the drawings to refer to the same or like parts. FIGS. 4A through 4D schematically depict one embodiment of a method for separating a glass sheet from a continuous glass ribbon. The method generally comprises engaging a conformable nosing with a first surface of a glass ribbon such that the conformable nosing conforms to the curvature of the glass ribbon. The glass ribbon is scored along a scoring line on a second surface of the glass ribbon. The conformable nosing is then at least partially disengaged from the first surface of the glass ribbon by adjusting a bow of the conformable nosing. A bending moment is applied to the glass ribbon to separate a glass sheet from the glass ribbon at the score line. Application of the bending moment conforms the curvature of the glass ribbon to the bow of the conformable nosing prior to the glass sheet separating from the glass ribbon. Methods for separating a glass sheet from a continuous glass ribbon and conformable nosing for use with such methods will be described in more detail herein with specific reference to the appended figures.

Figure 1:
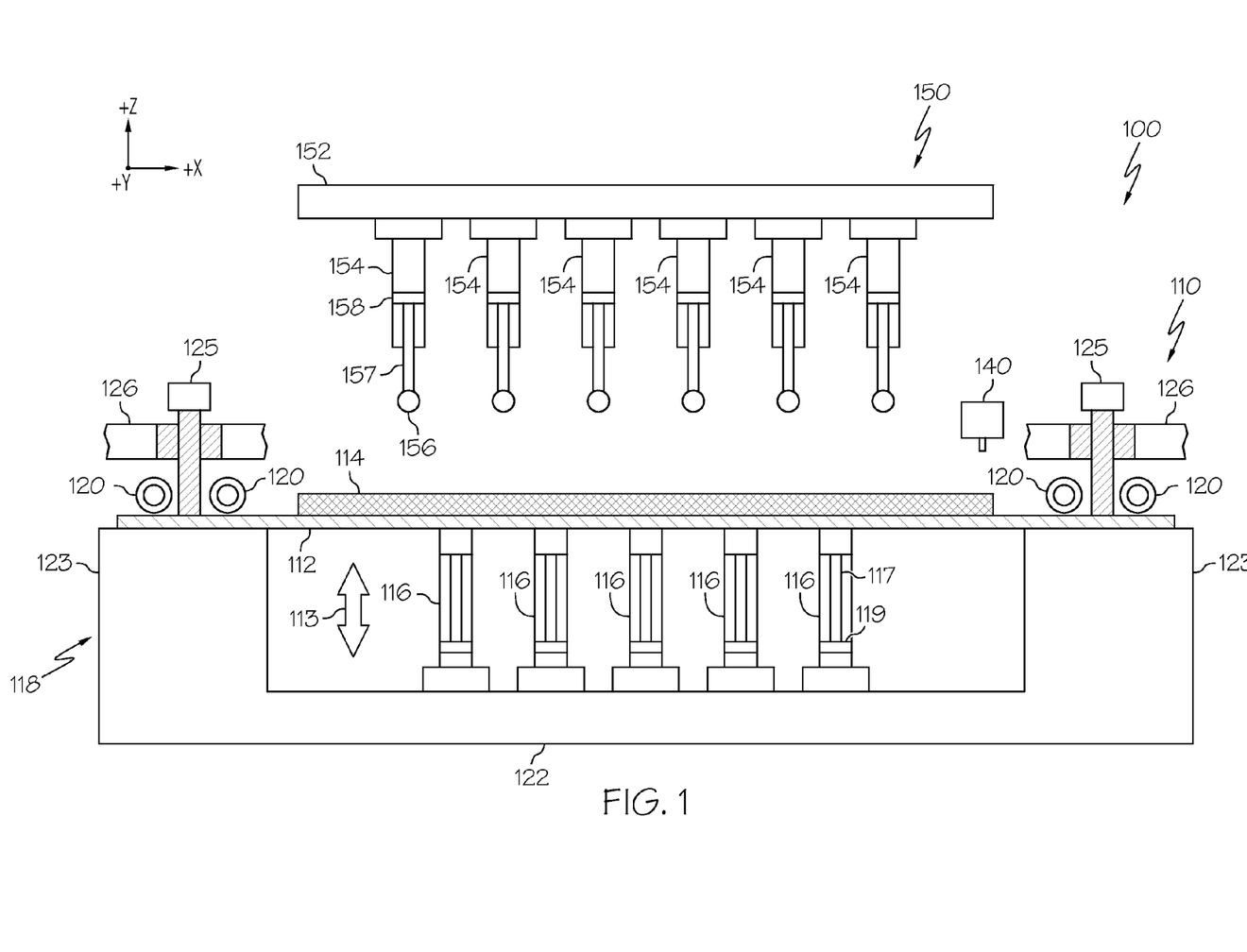
FIG. 1 schematically depicts a cross section of a traveling anvil machine with a conformable nosing for use in conjunction with one or more embodiments of the methods for separating a glass sheet from a continuous glass ribbon described herein.

Referring now to FIG. 1, one embodiment of a traveling anvil machine (TAM) 100 with a conformable nosing 110 is schematically depicted in cross section. The TAM 100 with conformable nosing 110 may be used in conjunction with one or more embodiments of the methods for separating a glass sheet from a continuous glass ribbon shown and described herein. The TAM 100 generally comprises a conformable nosing 110 and a scoring device 140. In the embodiment depicted in FIG. 1, the TAM 100 also comprises a passive support device 150. However, it should be understood that, in alternative embodiments, the TAM 100 may be constructed without the passive support device 150.

Still referring to FIG. 1, the conformable nosing 110 generally comprises a support frame 118, a flexible beam 112, and a plurality of extendable elements 116. In the embodiment depicted in FIG. 1 the support frame 118 generally comprises a base 122 and a pair of support arms 123 arranged in a u-shaped configuration. However, it should be understood that other possible configurations of the support frame 118 are possible.

The flexible beam 112 is formed from an elastically deformable material such as an elastically deformable metallic alloy, polymer or composite material. The flexible beam 112 is attached to the support frame 118 such that the flexible beam 112 extends over the open end of the "u" between the support arms 123. In the embodiment depicted in FIG. 1, the flexible beam 112 is attached to the support arms 123 with a pair of posts 125 secured in brackets 126. In one embodiment, the posts 125 are threadably secured in the brackets 126. The posts 125 exert a pressure against the flexible beam 112 securing the flexible beam 112 against the support arms 123. In the embodiment shown in FIG. 1, a plurality of rollers 120 are also used to secure the flexible beam 112 against the support arms 123. The rollers 120 permit the flexible beam 112 to be displaced in a lateral direction (i.e., in the +/– x-direction) when the flexible beam is deformed relative to the base 122 of the support frame 118. A nosing material 114, such as a rubber or a similar elastically deformable and recoverable material, is attached to an upper surface of the flexible beam 112 (i.e., the surface of the flexible beam 112 facing away from the support frame 118).

The plurality of extendable elements 116 (a total of five in FIG. 1) may comprise hydraulic cylinders, pneumatic cylinders, motor driven linear actuators or similar linear actuators which are utilized to elastically deform the flexible beam 112 relative to the support frame 118. In the embodiment shown in FIG. 1, the extendable elements 116 are pneumatic cylinders which have a piston 119 mechanically coupled to a shaft 117. The shaft 117 can be extended or retracted by controlling the amount of air or compressed fluid supplied to the extendable element 116. A first end of each extendable element is fixedly attached to the base 122 of the support frame 118. The second end of each extendable element 116 is pivotally attached to the underside of the flexible beam 112 (i.e., the side of the flexible beam 112 facing the support frame 118). The flexible beam 112 may be deformed in a direction away from the support frame 118 (i.e., in the positive z-direction in the coordinate axes depicted in FIG. 1) by extending the shaft 117 of one or more of the extendable elements 116 in the positive z-direction. The flexible beam 112 may be deformed in a direction towards the support frame 118 (i.e., in the negative z-direction on the coordinate axes depicted in FIG. 1) by retracting the shaft 117 of one or more of the extendable elements 116 in the negative z-direction. Further, it should also be understood that each extendable element 116 may be individually actuated (i.e., extended or retracted as indicated by arrow 113) such that a specific deformation of the flexible beam 112 may be achieved relative to the support frame 118.

Figure 3:
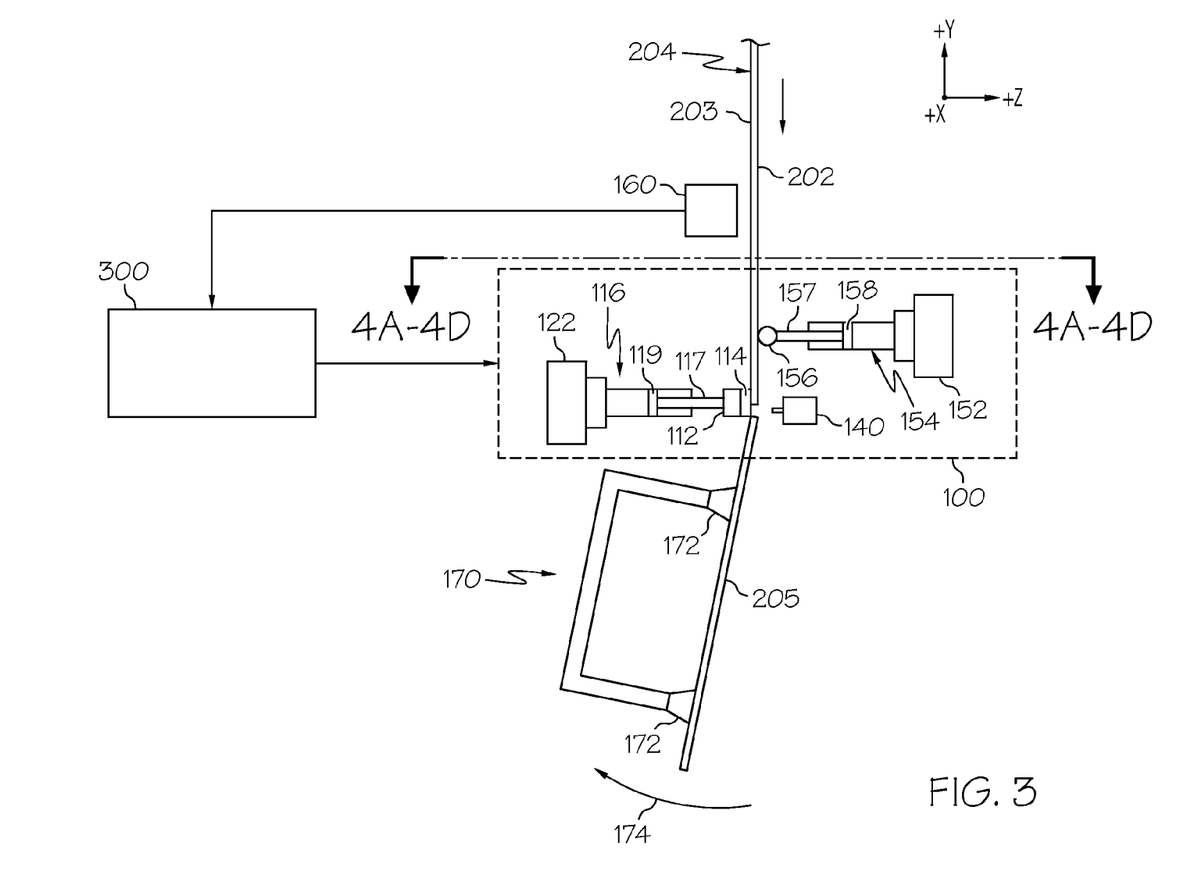
FIG. 3 schematically depicts a partial cross section of the exemplary glass manufacturing system of FIG. 1.

In the embodiment shown in FIG. 1, the scoring device 140 comprises a mechanical scoring device, such as a scoring wheel or scoring point. Alternatively, the scoring device 140 may be a laser scoring device. The scoring device 140 is coupled to an actuator (not shown) which is operable to traverse the scoring device 140 in the +/– x-direction relative to the support frame 118. The scoring device is also coupled to an actuator (not shown) which facilitates positioning the scoring device in the +/– z-direction as the scoring device 140 is traversed in the +/– x-direction. The scoring device 140 is positioned in the y-direction such that the scoring device, specifically the scoring wheel/scoring point, is directly opposite the conformable nosing 110, as depicted in FIG. 3. Accordingly, it should be understood that the scoring device 140 may be utilized to score a continuous glass ribbon as the continuous glass ribbon is supported on the conformable nosing 110 thereby introducing a scoring line in the continuous glass ribbon opposite the conformable nosing 110. A suitable scoring device for use in conjunction with the methods described herein is disclosed in U.S. Patent Application Publication No. 2008/0276785 filed May 9, 2007 and entitled "Constant Force Scoring Device and Method For Using the Same," the entirety of which is incorporated herein by reference.

In the embodiment of the TAM 100 with a conformable nosing 110 depicted in FIG. 1, the TAM 100 also includes a passive support device 150. The passive support device 150 comprises a support bar 152 on which a plurality of constant force air cylinders 154 are positioned. Each air cylinder 154 comprises a piston 158 to which a shaft 157 is coupled. The shaft may be passively extended and retracted from the air cylinder 154 as mechanical pressure is applied to the contact point 156 of each shaft 157. The contact points 156 of the air cylinder 154 may be formed from a rubber material, a ceramic material, ruby, or any other suitable material for contacting glass without scratching or damaging the glass. In the embodiments of the TAM 100 described herein, the contact points 156 are generally offset from the flexible beam 112 of the conformable nosing 110 in the positive y-direction such that the contact points 156 do not directly oppose the flexible beam 112 of the conformable nosing 110, as depicted in FIG. 3.

In the embodiments of the TAM 100 described herein, the passive support device 150 may be coupled to one or more actuators (not shown), such as robotic arms, CNC positioning devices, pneumatic cylinders, hydraulic cylinders, or the like, such that the passive support device 150 may be positioned relative to the conformable nosing 110 in the +/− z-direction. The passive support device 150 is used to secure a continuous glass ribbon as the continuous glass ribbon is scored and separated thereby reducing excessive motion and vibration in the continuous glass ribbon and preventing such motion from propagating upstream of the TAM 100 (i.e., in the positive y-direction). Specifically, the constant force air cylinders 154 hold the continuous glass ribbon to the nosing material 114 of the flexible beam 112 as the scoring device 140 traverses over the continuous glass ribbon thereby scoring the continuous glass ribbon, as will be described in more detail herein.

While the TAM 100 has been described herein as comprising a passive support device 150, it should be understood that, in other embodiments (not shown), the TAM 100 may be constructed without the passive support device 150. In these embodiments, the TAM 100 comprises the conformable nosing 110 and the scoring device 140.

The TAM 100 with conformable nosing 110 depicted in FIG. 1 is one embodiment of a TAM suitable for use conjunction with the methods for separating glass sheets from continuous glass ribbons that will be described in more detail herein. However, it should be understood that other embodiments of TAMs with conformable nosing may also be used. For example, TAMs with conformable nosing suitable for use in conjunction with the methods described herein are disclosed in U.S. Patent Application Publication No. 2008/0276646, filed May 9, 2007 and entitled "Conformable Nosing Device For Reducing Motion And Stress Within A Glass Sheet While Manufacturing The Glass Sheet," the entirety of which is incorporated herein by reference.

Figure 2:
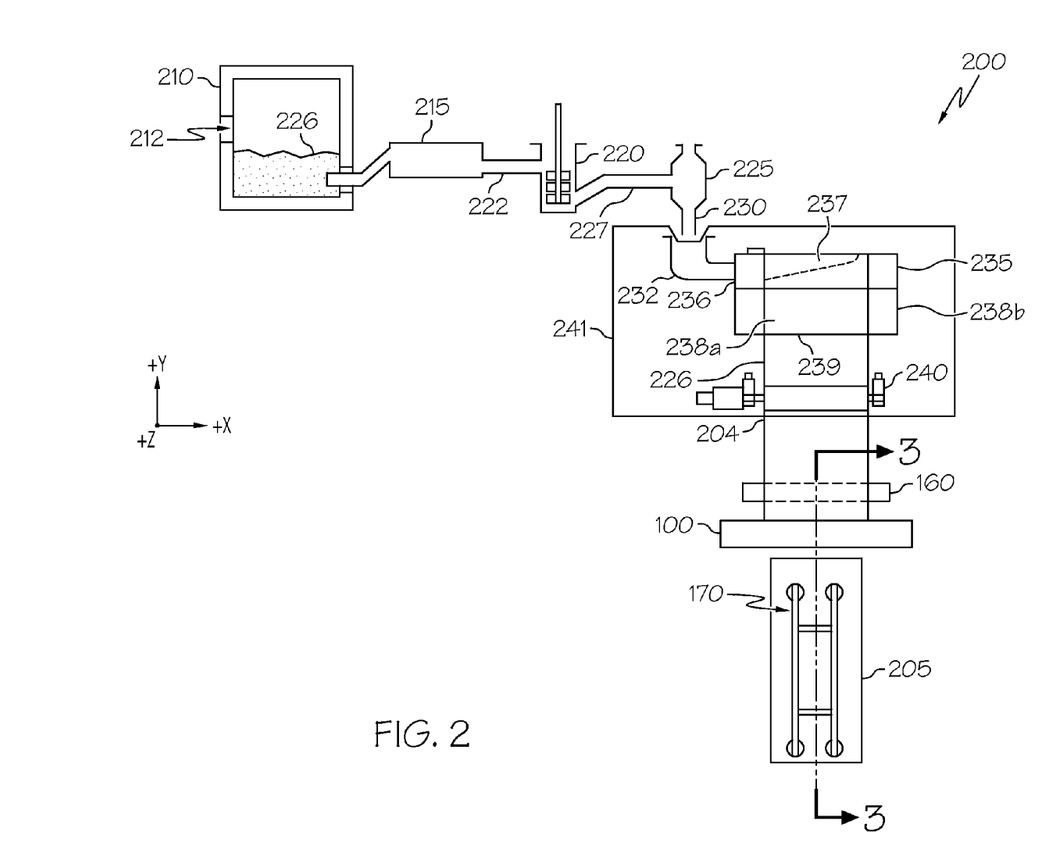
FIG. 2 schematically depicts an exemplary glass manufacturing system utilizing a conformable nosing to separate a glass sheet from a continuous ribbon of glass.

Referring now to FIG. 2, one embodiment of an exemplary glass manufacturing system 200 is schematically depicted. The glass manufacturing system utilizes a TAM 100 with a conformable nosing as depicted in FIG. 1. The glass manufacturing system 200 includes a melting vessel 210, a fining vessel 215, a mixing vessel 220, a delivery vessel 225, a fusion draw machine (FDM) 241 and TAM 100. Glass batch materials are introduced into the inciting vessel 210 as indicated by arrow 212. The batch materials are melted to form molten glass 226. The fining vessel 215 has a high temperature processing area that receives the molten glass 226 from the melting vessel 210 and in which bubbles are removed from the molten glass 226. The fining vessel 215 is fluidly coupled to the mixing vessel 220 by a connecting tube 222. The mixing vessel 220 is, in turn, fluidly coupled to the delivery vessel 225 by a connecting tube 227.

The delivery vessel 225 supplies the molten glass 226 through a downcomer 230 into the FDM 241. The FDM 241 comprises an inlet 232, a forming vessel 235, and a pull roll assembly 240. As shown in FIG. 2, the molten glass 226 from the downcomer 230 flows into an inlet 232 which leads to the forming vessel 235. The forming vessel 235 includes an opening 236 that receives the molten glass 226 which flows into a trough 237 and then overflows and runs down two sides 238a and 238b before fusing together at a root 239. The root 239 is where the two sides 238a and 238b come together and where the two overflow walls of molten glass 226 rejoin (e.g., refuse) before being drawn downward by the pull roll assembly 240 to form the continuous glass ribbon 204.

As the continuous glass ribbon 204 exits the pull roll assembly 240, the molten glass solidifies. Due to the differences in the thickness of the molten glass at the edges and center of the continuous glass ribbon 204, the center of the continuous glass ribbon cools and solidifies more quickly than the edges of the continuous glass ribbon creating a temperature gradient from the edges to the center of the continuous glass ribbon 204. As the molten glass cools, the temperature gradient causes stresses to develop in the glass which, in turn, causes the glass to bow or curve in a lateral direction (i.e., in the direction from one edge of the glass to the other). Accordingly, it should be understood that the continuous glass ribbon 204 has a radius of curvature in a lateral direction.

The method of using the TAM 100 with conformable nosing 110 to separate a glass sheet 205 from a curved continuous glass ribbon 204 will now be described in more detail with reference to FIGS. 2, 3 and 4A-4D.

Referring now to the glass manufacturing system 200 schematically depicted in FIG. 2 and the partial cross section of the system 200 depicted in FIG. 3, the pull roll assembly 240 delivers the drawn continuous glass ribbon 204 (which at this point in the manufacturing process has a curved/bowed shape) to the TAM 100 which includes a conformable nosing 110 and a scoring device 140, as described above. Before the continuous glass ribbon 204 enters the TAM 100, the continuous glass ribbon is drawn past a curvature detector 160. The curvature detector 160 is used to determine the curvature of the continuous glass ribbon 204 and comprises a plurality of sensors operable to detect the distance between the curvature detector 160 and the continuous glass ribbon 204 and, as such, the curvature of the continuous glass ribbon 204. For example, the curvature detector 160 may comprise a plurality of laser micrometers, ultrasonic sensors or any other sensor suitable for determining a distance between two objects. The curvature detector 160 outputs a signal indicative of the radius of curvature of the continuous glass ribbon 204 to a control system 300. The control system 300 is operatively coupled to the conformable nosing 110 of the TAM 100 and is operable to adjust an amount of compressed fluid (e.g., air or a similar compressed fluid) supplied to each of the extendable elements 116 of the conformable nosing 110 such that a bow of the conformable nosing 110 may be adjusted to a scoring bow which conforms to the curvature of the continuous glass ribbon 204.

Figure 4A:
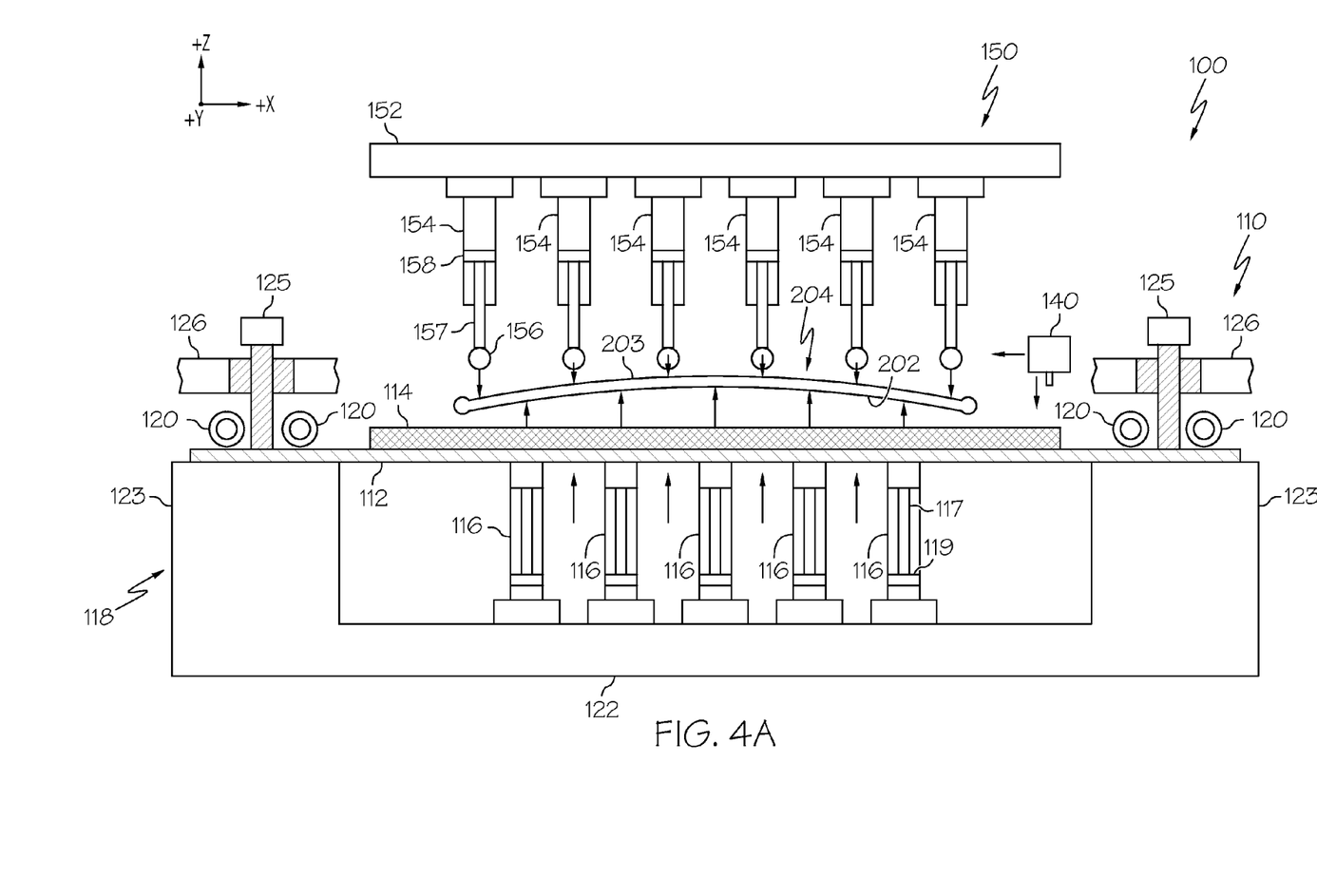
FIGS. 4A-4D schematically depict the traveling anvil machine with conformable nosing of FIG. 1 being used to separate a glass sheet from a continuous glass ribbon according to one or more embodiments shown and described herein.
Figure 4B:
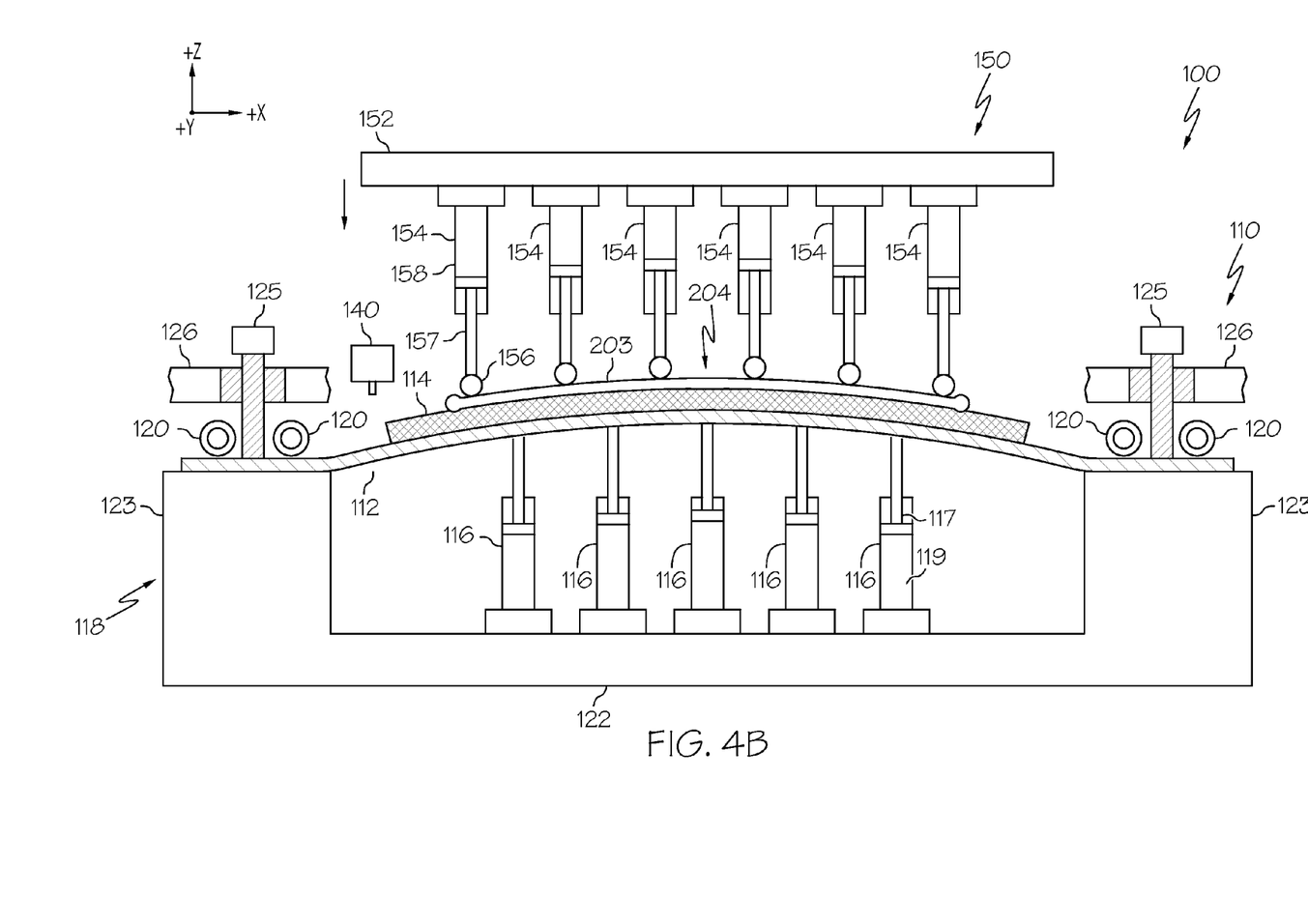

Referring now to FIGS. 4A and 4B, after passing by the curvature detector 160, the continuous glass ribbon 204 is drawn through the TAM 100 between the passive support device 150 and the conformable nosing 110. Initially, the passive support device 150 and the conformable nosing 110 are in neutral positions such that neither the passive support device 150 nor the conformable nosing 110 makes contact with the continuous glass ribbon 204, as illustrated in FIG. 4A. Thereafter, the control system 300 adjusts the bow of the conformable nosing 110 to conform to the curvature of the continuous glass ribbon 204 based on the signal received from the curvature detector 160. The bow of the conformable nosing 110, as used herein, refers to the deformation imparted to the flexible beam 112 by the extendable elements 116. The control system 300 adjusts the bow of the conformable nosing 110 by adjusting the amount of compressed fluid supplied to each of the extendable elements 116 of the conformable nosing 110 thereby adjusting the displacement of the shaft 117 of each extendable element 116 relative to the support frame 118. As the shaft 117 of each extendable element 116 is adjusted (i.e., extended or retracted), each shaft 117 exerts a deformation force on the flexible beam 112 in the +/− z-direction. Because the motion of the flexible beam 112 is constrained with respect to the support arms 123, the deformation force exerted by the shafts 117 deforms the flexible beam 112 relative to the support frame 118 between the support arms 123.

For example, FIG. 4B schematically illustrates a configuration of the conformable nosing 110 where the flexible beam 112 is deformed to match the curvature of the continuous glass ribbon 204. As shown in FIG. 4B, the shaft 117 of each shaft 117 of each extendable element 116 is extended to achieve a desired deformation of the flexible beam 112 such that the bow of the conformable nosing 110 conforms to the curvature of the continuous glass ribbon 204. When the bow of the conformable nosing is adjusted to conform to the curvature of the continuous glass ribbon 204, the bow of the conformable nosing 110 is referred to herein as a scoring bow.

In one embodiment, the conformable nosing 110 is engaged with a first surface 202 of the continuous glass ribbon 204 after the bow of the conformable nosing 110 has been adjusted to the scoring bow. In this embodiment, the flexible beam 112 is advanced towards the first surface 202 of the continuous glass ribbon 204 until the nosing material 114 attached to the flexible beam 112 engages the first surface 202 of the continuous glass ribbon 204 along a nosing contact line. The nosing contact line, as used herein, refers to the line of contact between the first surface 202 of the continuous glass ribbon 204 and the nosing material 214 of the flexible beam 112. For example, after the bow of the conformable nosing 110 is adjusted to the scoring bow, the shaft 117 of each extendable element 116 may be uniformly advanced in the positive z-direction towards the first surface 202 of the continuous glass ribbon 204 until the nosing material 114 impinges against the first surface 202 of the continuous glass ribbon 204, as depicted in FIG. 4B.

In an alternative embodiment, the control system 300 adjusts the bow of the conformable nosing 110 to the scoring bow as the flexible beam 112 is advanced towards the first surface 202 of the continuous glass ribbon 204 with the extendable elements 116 until the nosing material 114 engages the first surface 202 of the continuous glass ribbon 204 along a nosing contact line.

In one embodiment, when the TAM 100 comprises a passive support device 150 as depicted in FIGS. 4A and 4B, the passive support device 150 may be advanced towards the conformable nosing 110 (i.e., the passive support device is advanced in the negative z-direction) until the contact points 156 of the passive support device 150 engage with the second surface 203 of the continuous glass ribbon 204. In this embodiment, the continuous glass ribbon 204 is impinged between the contact points 156 of the passive support device 150 and the nosing material 114 of the conformable nosing 110, as depicted in FIG. 4B. The contact points 156 of the passive support device 150 engage with the second surface 203 of the continuous glass ribbon 204 along a passive support contact line which is generally offset from the nosing contact line in an upstream direction (i.e., in the positive y-direction as schematically illustrated in FIG. 3) such that the second surface 203 of the continuous glass ribbon can be scored opposite the nosing material 114.

Referring now to FIG. 4B, after the conformable nosing 110 is engaged with the first surface 202 of the continuous glass ribbon 204, the scoring device 140 is utilized to score the continuous glass ribbon 204 along a scoring line on the second surface 203 of the continuous glass ribbon 204. Specifically, the scoring device 140 is traversed over the second surface 203 of the continuous glass ribbon 204 in the x-direction along a scoring line which is opposite the nosing contact line on the first surface 202 of the continuous glass ribbon 204. The position of the scoring device 140 in the +/− z-direction is adjusted with an actuator (not shown) such that the scoring device 140 follows the curvature of the second surface 203 of the continuous glass ribbon 204 while simultaneously provide a scoring force against the second surface 203 of the continuous glass ribbon 204 as the scoring device 140 is traversed in the x-direction. The continuous glass ribbon 204 is supported with the scoring bow of the conformable nosing 110 as the scoring device 140 is traversed over the second surface 203 of the continuous glass ribbon 204 thus preventing deformation and/or breakage of the continuous glass ribbon 204 as the scoring force is applied.

Figure 4C:
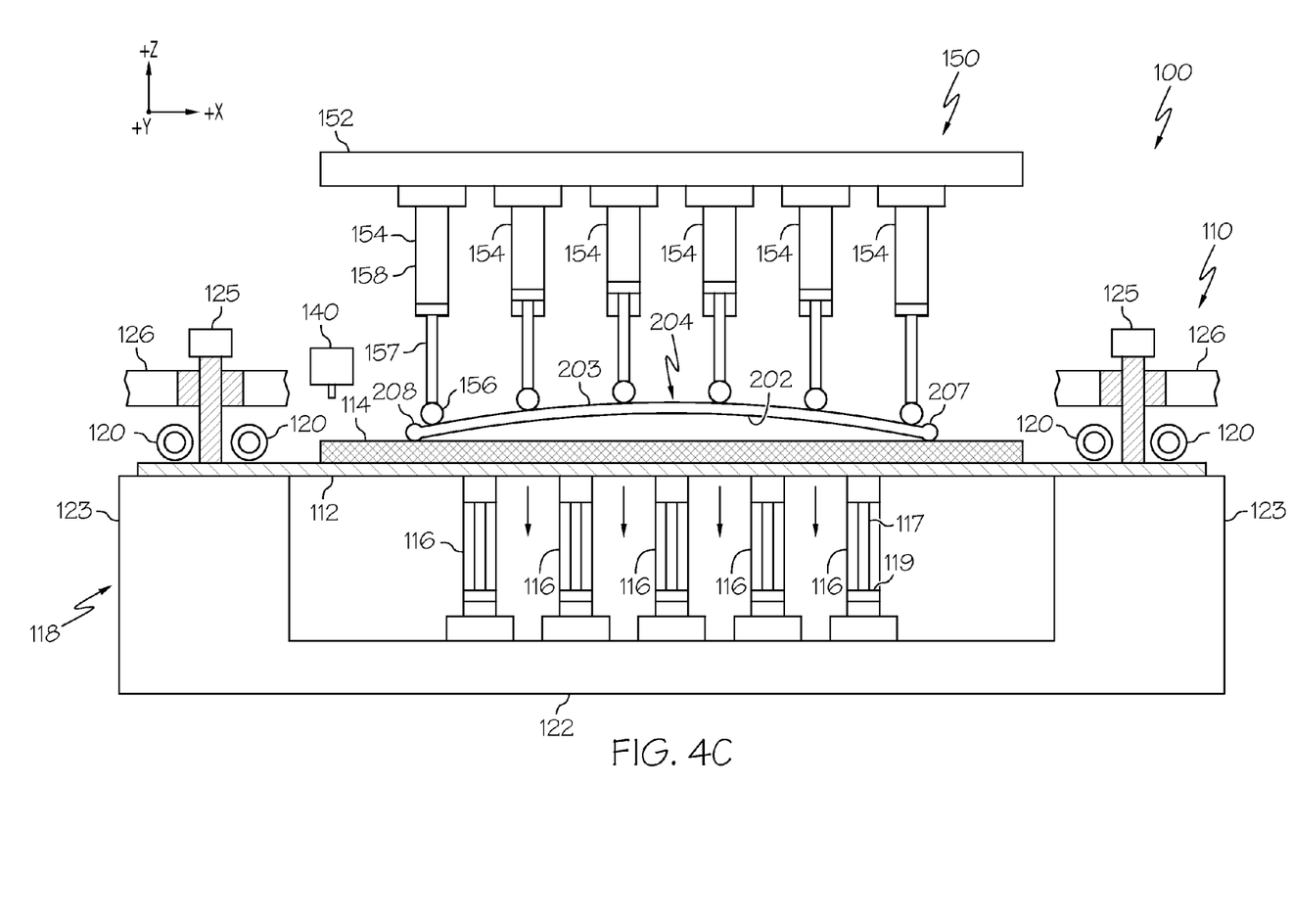

Referring now to FIG. 4C, after the continuous glass ribbon 204 is scored, the bow of the conformable nosing 110 is readjusted from the scoring bow to a separation bow such that the conformable nosing 110 is at least partially disengaged from the first surface 202 of the continuous glass ribbon 204 along the nosing contact line as depicted in FIG. 4C. In order to readjust the bow of the conformable nosing 110 from the scoring how to the separation bow, an amount of air supplied to each extendable element 116 is adjusted such that the shaft 117 of each extendable clement 116 is retracted towards the support frame 118. As each shaft 117 is retracted, the shaft 117 exerts a deformation force on the flexible beam 112 which pulls the flexible beam 112 towards the support frame 118 thereby flattening the flexible beam 112, as depicted in FIG. 4C. When the flexible beam 112 is adjusted to at least partially disengage the conformable nosing 110 from the first surface of the continuous glass ribbon 204, the bow of the conformable nosing 110 is referred to herein as a separation bow. In the embodiment of the conformable nosing 110 depicted in FIG. 4C, the separation bow of the conformable nosing 110 is substantially linear (i.e., flat). However, in other embodiments, the flexible beam 112 may have some amount of curvature when the bow of the conformable nosing is a separation bow so long as the conformable nosing is at least partially disengaged from the first surface 202 of the continuous glass ribbon 204 along the nosing contact line.

In one embodiment, the conformable nosing 110 is only partially disengaged from the first surface 202 of the continuous glass ribbon 204 along the nosing contact line (i.e., the nosing material 114) when the bow of the conformable nosing 110 is a separation bow. For example, when the flexible beam 112 is retracted from the first surface 202 of the continuous glass ribbon 204, the edges 207, 208 of the continuous glass ribbon 204 remain in contact with the nosing material 114 of the flexible beam 112, as depicted in FIG. 4C. In an alternative embodiment (not shown), the conformable nosing 110 is completely disengaged from the first surface 202 of the continuous glass ribbon 204 when the bow of the conformable nosing 110 is a separation bow such that the first surface 202 of the continuous glass ribbon 204 is spaced apart from the nosing material 114 of the conformable nosing 110 along the length of the flexible beam 112. Completely or partially disengaging the conformable nosing from the first surface 202 of the continuous glass ribbon 204 allows the curvature of the continuous glass ribbon to flatten in the +/− x-direction and the negative z-direction as a bending moment is applied to the continuous glass ribbon 204 without the glass sheet and/or the continuous glass ribbon breaking in areas adjacent to the scoring line.

Figure 4D:
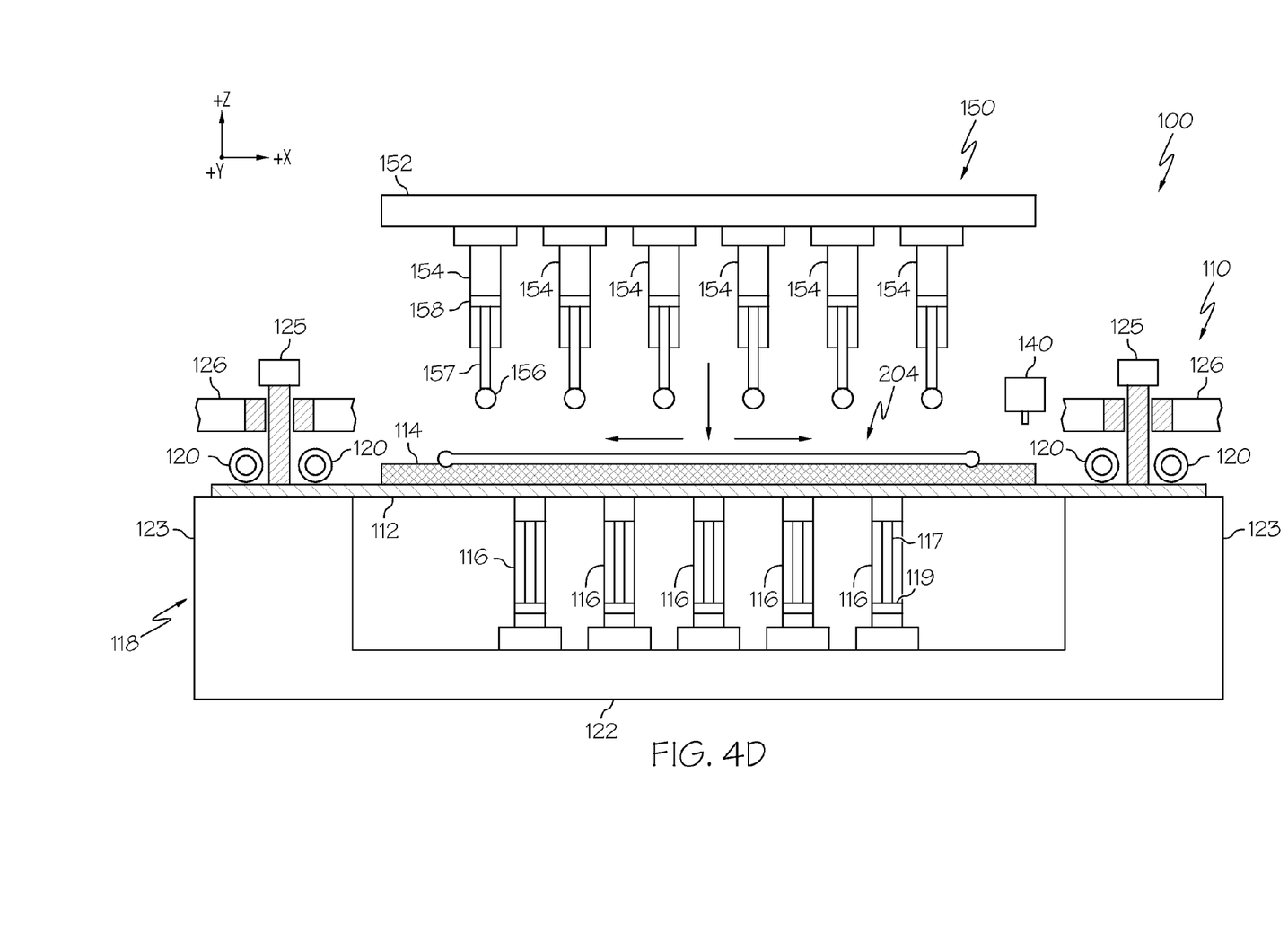

Referring now to FIGS. 3 and 4D, after the conformable nosing 110 has been at least partially disengaged from the first surface 202 of the continuous glass ribbon 204, a bending moment is applied to the continuous glass ribbon 204 to separate a glass sheet 205 from the continuous glass ribbon 204 at the scoring line. In one embodiment, the bending moment is applied to the continuous glass ribbon 204 with a carriage 170 as depicted in FIG. 3. The carriage 170 is shuttled into place with an actuator (not shown), such as a robotic arm or a similar actuator, and attached to the continuous glass ribbon 204 downstream of the conformable nosing 110 (i.e., in the negative y-direction in FIG. 3) using vacuum chucks 172 or similar tooling for securing a glass sheet. After the carriage 170 is attached to the continuous glass ribbon 204, a bending moment is applied to the continuous glass ribbon 204 by pivoting the carriage 170 towards the conformable nosing as indicated by arrow 174. The applied bending moment bends the continuous glass ribbon against the flattened separation bow of the conformable nosing 110.

As the bending moment is applied to the continuous glass ribbon 204, the curvature of the continuous glass ribbon 204 tends to flatten. Because the conformable nosing 110 is at least partially disengaged from the continuous glass ribbon 204 when bow of the conformable nosing 110 is a separation bow, the continuous glass ribbon 204 is not constrained by the conformable nosing 110 in either the x-direction or the z-direction of the coordinate axes depicted in FIG. 4D. As such, application of the bending moment to the continuous glass ribbon 204 flattens the continuous glass ribbon 204 against the nosing material 114 thereby reengaging the continuous glass ribbon 204 with the conformable nosing 110 and conforming the curvature of the continuous glass ribbon 204 to the separation bow of the conformable nosing 110. The flattened curvature of the scoring bow prevents uncontrolled breakage of the glass sheet 205 and/or the continuous glass ribbon 204 in areas adjacent to the scribing line as the continuous glass ribbon is bent against the conformable nosing 110. Once the curvature of the continuous glass ribbon 204 is flattened against the nosing material 114 as depicted in FIG. 4D, continued application of the bending moment causes the glass sheet 205 to separate from the continuous glass ribbon 204 along the scribe line, as depicted in FIG. 3, without uncontrolled breakage adjacent to the scribe line.

The methods for separating a glass sheet from a continuous ribbon of glass described herein are particularly well suited for use in conjunction with continuous glass ribbons which have widths greater than about 1.5 meters, more preferably greater than about 1.75 meters and, most preferably, greater than about 2.0 meters and thicknesses of less than 1.5 mm, more preferably less than 1.0 mm and, most preferably 0.7 mm or less. However, it should also be understood that the techniques described herein may also be suitable for use in conjunction with continuous glass ribbons having widths of less than 1.5 meters and thicknesses of less than 0.7 mm.

The methods described herein may be used to separate glass sheets from continuous glass ribbons, such as the continuous glass ribbons produced with the fusion draw process or similar downdraw processes. It should be understood that stresses, deformation and potential breakage of the continuous glass ribbon during scoring can be substantially mitigated or eliminated by adjusting the bow of the conformable nosing to a scoring bow prior to engaging the conformable nosing with the continuous glass ribbon, as described herein. Further, breakage of the continuous glass ribbon and/or the glass sheet in areas adjacent to the scoring line may be substantially mitigated or eliminated by adjusting the bow of the conformable nosing from the scoring bow to a separation bow prior to application of a bending moment such that the glass ribbon is unconstrained and free to flex and conform to the conformable nosing as the bending moment is applied. Accordingly, it should be understood that the methods described herein may be utilized to reduce the occurrence of breakage in the continuous glass ribbon and/or glass sheets separated from the continuous glass ribbon and thereby reduce waste and improve the throughput of a glass manufacturing system.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming a glass sheet from a continuous glass ribbon, the method comprising:
   forming the continuous glass ribbon with a curvature in a lateral direction;
   adjusting a bow of a conformable nosing to a scoring bow which conforms to the curvature of the continuous glass ribbon;
   engaging the conformable nosing with a first surface of the continuous glass ribbon such that the conformable nosing contacts the first surface of the continuous glass ribbon on a nosing contact line;
   scoring the continuous glass ribbon along a scoring line on a second surface of the continuous glass ribbon, wherein the scoring line is opposite the nosing contact line;
   readjusting the bow of the conformable nosing to a separation bow such that the conformable nosing is at least partially disengaged from the first surface of the continuous glass ribbon along a length of the nosing contact line; and
   applying a bending moment to the continuous glass ribbon while the conformable nosing is at least partially disengaged from the first surface of the continuous glass ribbon to separate the glass sheet from the continuous glass ribbon at the scoring line, wherein application of the bending moment reengages the continuous glass ribbon with the conformable nosing along the length of the nosing contact line and flattens the curvature of the continuous glass ribbon to the separation bow of the conformable nosing prior to the glass sheet separating from the continuous glass ribbon.

2. The method of claim 1 further comprising determining the curvature of the continuous glass ribbon before adjusting the bow of the conformable nosing to the scoring bow.

3. The method of claim 1 further comprising engaging a passive support device with the second surface of the continuous glass ribbon.

4. The method of claim 3, wherein the passive support device is offset from the conformable nosing in an upstream direction.

5. The method of claim 1, wherein the separation bow of the conformable nosing is substantially linear.

6. The method of claim 1, wherein edges of the continuous glass ribbon are in contact with the conformable nosing after the bow of the conformable nosing is readjusted to the separation bow.

7. The method of claim 1, wherein the bow of the conformable nosing is adjusted to the scoring bow as the conformable nosing is engaged with the first surface of the continuous glass ribbon.

8. The method of claim 1, wherein the conformable nosing comprises:
- a support frame;
- a flexible beam coupled to the support frame such that the flexible beam is deformable relative to the support frame;
- a nosing material attached to the flexible beam; and
- a plurality of extendable elements, wherein each extendable element comprises a first end attached to the support frame and a second end positioned to exert a deformation force on the flexible beam when the extendable element is extended towards the flexible beam.

9. The method of claim 8, wherein the second end of each extendable element is attached to the flexible beam.

10. The method of claim 8 wherein each extendable element comprises a pneumatic actuator.

11. The method of claim 8, wherein each extendable element comprises an electric motor.

12. The method of claim 1, wherein the conformable nosing is coupled to a travelling anvil machine.

13. The method of claim 1, wherein the continuous glass ribbon has a width greater than 1.5 meters.

14. A method for separating a glass sheet from a continuous glass ribbon, the method comprising:
- forming a continuous glass ribbon having a curvature in a lateral direction;
- determining the curvature of the continuous glass ribbon;
- engaging a conformable nosing with a first surface of the continuous glass ribbon such that the conformable nosing contacts the first surface of the continuous glass ribbon and conforms to the curvature of the continuous glass ribbon along a nosing contact line;
- engaging a passive support device with a second surface of the continuous glass ribbon;
- scoring the continuous glass ribbon along a scoring line on the second surface of the continuous glass ribbon;
- disengaging the conformable nosing from the first surface of the continuous glass ribbon along at least a portion of a length of the nosing contact line; and
- applying a bending moment to the continuous glass ribbon while the conformable nosing is at least partially disengaged from the first surface of the continuous glass ribbon to separate the glass sheet from the continuous glass ribbon at the scoring line, wherein application of the bending moment reengages the continuous glass ribbon with the conformable nosing along the length of the nosing contact line and flattens the curvature of the continuous glass ribbon to a bow of the conformable nosing prior to the glass sheet separating from the continuous glass ribbon.

15. The method of claim 14 further comprising adjusting the bow of the conformable nosing to a scoring bow based on the curvature of the continuous glass ribbon before engaging the conformable nosing with the first surface of the continuous glass ribbon, wherein the scoring bow conforms to the curvature of the continuous glass ribbon.

16. The method of claim 14, wherein the conformable nosing is disengaged from the first surface of the continuous glass ribbon by adjusting the bow of the conformable nosing.

17. The method of claim 16, wherein the bow of the conformable nosing is substantially linear after the bow is adjusted.

18. The method of claim 14, wherein edges of the continuous glass ribbon are in contact with the conformable nosing after the conformable nosing is disengaged from the continuous glass ribbon along at least a portion of the length of the nosing contact line.

19. The method of claim 14, wherein the passive support device is engaged with the second surface of the continuous glass ribbon upstream of the nosing contact line.

20. The method of claim 14, wherein the continuous glass ribbon has a width greater than 1.5 meters.

* * * * *